United States Patent [19]
Wright

[11] Patent Number: 6,079,266
[45] Date of Patent: Jun. 27, 2000

[54] FLUID-LEVEL MEASUREMENT BY DYNAMIC EXCITATION OF A PRESSURE- AND FLUID-LOAD-SENSITIVE DIAPHRAGM

[75] Inventor: Hubert A. Wright, Winchester, Mass.

[73] Assignee: Starr-Johnson, Winchester, Mass.

[21] Appl. No.: 09/283,475

[22] Filed: Apr. 1, 1999

[51] Int. Cl.[7] .................................................. G01F 23/00
[52] U.S. Cl. ..................... 73/299; 73/290 V; 73/290 B
[58] Field of Search ................................ 73/290 V, 299, 73/32 A, 1.83, 1.73, DIG. 5, DIG. 1, 290 B; 340/612, 618

[56] References Cited

U.S. PATENT DOCUMENTS

| | | | |
|---|---|---|---|
| 3,693,445 | 9/1972 | Johnson | 73/290 |
| 3,820,098 | 6/1974 | Demyon et al. | 340/244 B |
| 3,967,490 | 7/1976 | Brady | 73/32 A |
| 4,107,994 | 8/1978 | Sogo | 73/290 |
| 4,112,760 | 9/1978 | Ishiwata | 73/299 |
| 4,193,291 | 3/1980 | Lynnworth | 73/32 A |
| 4,193,303 | 3/1980 | Egnell | 73/438 |
| 4,343,184 | 8/1982 | Jaulmes | 73/323 |
| 4,526,480 | 7/1985 | Ward | 374/117 |
| 4,535,627 | 8/1985 | Prost et al. | 73/290 B |
| 4,545,245 | 10/1985 | Sharp | 73/290 V |
| 4,740,726 | 4/1988 | Umezawa | 73/290 V |
| 4,896,535 | 1/1990 | Duckart et al. | 73/290 V |
| 4,920,796 | 5/1990 | Duckart et al. | 73/290 V |
| 4,922,745 | 5/1990 | Rudkin et al. | 73/32 A |
| 4,961,345 | 10/1990 | Tsuroka et al. | 73/32 A |
| 5,035,140 | 7/1991 | Daniels et al. | 73/290 V |
| 5,054,318 | 10/1991 | Lew | 73/290 |
| 5,074,148 | 12/1991 | Lew | 73/290 V |
| 5,184,510 | 2/1993 | Rossman | 73/290 V |
| 5,345,811 | 9/1994 | Alexandrovich, Sr. et al. | 73/32 A |
| 5,359,902 | 11/1994 | Barger et al. | 73/862.626 |
| 5,383,349 | 1/1995 | Blake-Coleman | 73/32 A |
| 5,534,853 | 7/1996 | Pioch | 340/646 |
| 5,600,997 | 2/1997 | Kemp et al. | 73/290 |
| 5,743,138 | 4/1998 | Cheng | 73/322.5 |

Primary Examiner—Hezron Williams
Assistant Examiner—Thuy Vinh Tran
Attorney, Agent, or Firm—Cesari and McKenna, LLP

[57] ABSTRACT

Magnetic force from a momentarily excited coil (34) results in oscillatory flexure of a flexible diaphragm (30) loaded on one side by a liquid (10) whose level is to be measured. A strain gauge (46) detects the diaphragm flexure, and analysis circuitry (62) determines the liquid level as a function of the resultant oscillation frequency and the diaphragm's static flexure.

17 Claims, 5 Drawing Sheets

FLUID-LEVEL MEASUREMENT BY DYNAMIC EXCITATION OF A PRESSURE- AND FLUID-LOAD-SENSITIVE DIAPHRAGM

BACKGROUND OF THE INVENTION

The present invention is directed to liquid-load measurements and in particular to sensors of the vibrating-diaphragm type.

Many approaches have been taken to making liquid-load measurements. One approach particularly well suited to some applications is that of determining the loading on a vibrating diaphragm that has been placed in contact with the liquid. The mass of liquid that loads the diaphragm affects the diaphragm's response to flexural excitation. The loading inferred from the diaphragm's vibration can be used to determine the depth of a liquid of known density or the density of a liquid of known depth.

U.S. Pat. No. 5,035,140 to Daniels et al., for instance, describes a sensor arrangement in which a member potentially loaded by liquid in a tank is caused to vibrate, and the resultant vibration is measured to determined whether it is consistent with the member's being loaded by the liquid. Such a sensor is employed to determine whether liquid in a tank has reached a level at which the sensor is mounted.

Although the Daniels et al. sensor presumably performs adequately for the indicated purpose, it is not well suited to providing a relatively accurate liquid-load measurement throughout a continuous load range. For that purpose, U.S. Pat. No. 5,345,811 to Alexandrovich et al. describes an approach that can be used to measure the density of fuel in an aircraft tank. The Alexandrovich et al. arrangement infers the density from the natural vibration frequency of a diaphragm as loaded by the fuel, with which it is in contact. To achieve the desired accuracy, Alexandrovich et al. employ processor-based calibrations to determine coefficients in an equation relating the density to the natural frequency. With these coefficients, a processor calculates the density of the tested fluid from the observed frequency.

To minimize the effects that ambient-pressure variations would have on the measurement, Alexandrovich et al. mount and excite the diaphragm in a special fashion. Specifically, the diaphragm extends through a sealed slit in the tank wall, and the diaphragm is so excited as to assume vibration in a mode that has a node at the wall location. This allows both faces of the diaphragm to be exposed to the fuel so as to cancel out pressure effects.

SUMMARY OF THE INVENTION

I have recognized that the complex mechanical arrangement employed by Alexandrovich et al. to minimize pressure effects can be dispensed with by simply taking a static-flexure measurement along with the measurement of the diaphragm's response to flexural excitation. By using calibration data taken for different pressures, the static measurement can be used in the liquid-loading calculation to eliminate any pressure effects. As will be seen below, moreover, the pressure-effect calibration can be performed in a relatively simple manner, and it will be convenient in many embodiments to employ a common transducer both for the static-flexure measurement and for the measurement of the response to flexural excitation.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
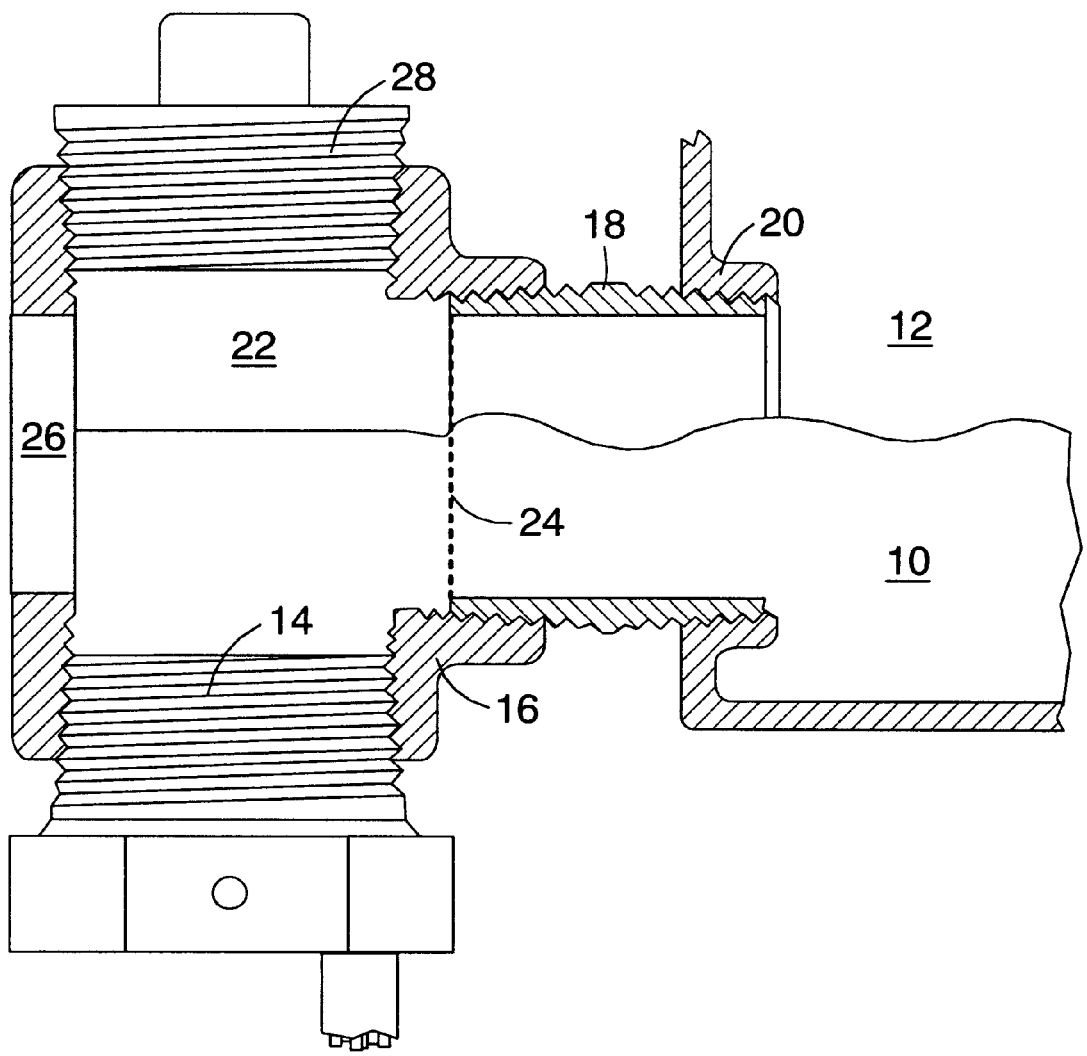
FIG. 1 a cross-sectional view of a fluid reservoir on which a measurement chamber and a sensor assembly embodying the present invention's teachings have been mounted.

To illustrate the invention, FIG. 1 depicts the invention as being applied to sensing the level of a lubricant liquid 10 in a lubricant reservoir 12. For example, the reservoir may be the lubricant sump of a compressor in a bank of compressors. This is the preferred cooling-system configuration in some commercial installations, and it is particularly important in such installations to monitor the level in the reservoir so that the compressor will not have its lubricant scavenged by others in the bank.

As was mentioned above, the present invention's approach to monitoring this level is to excite a flexible diaphragm in contact with the lubricant 10 and infer its level from the diaphragm's response. The sensor assembly containing the diaphragm can be placed anywhere in the lubricant reservoir 12 that will permit the diaphragm to be in contact with the liquid 10. In the particular application that FIG. 1 illustrates, though, I prefer to place the sensor assembly 14 at the bottom of a separate but connected chamber.

The chamber is formed by a housing 16 that a coupling 18 secures into the type of sight-glass port 20 commonly provided in such installations in order to monitor lubricant level visually. The liquid 10 is free to flow into the chamber 22, although it may be preferable in some installations to include a screen 24 within the coupling 18 for various purposes, such as to eliminate large contaminants or introduce a flow resistance that reduces agitation and sonic coupling between the chamber 22 and the reservoir 12 at the expected vibrational frequencies.

To keep the visual-monitoring capability, some installations may fit the chamber housing 16 with a sight glass 26. An appropriate plug 28 caps the chamber.

Figure 2:
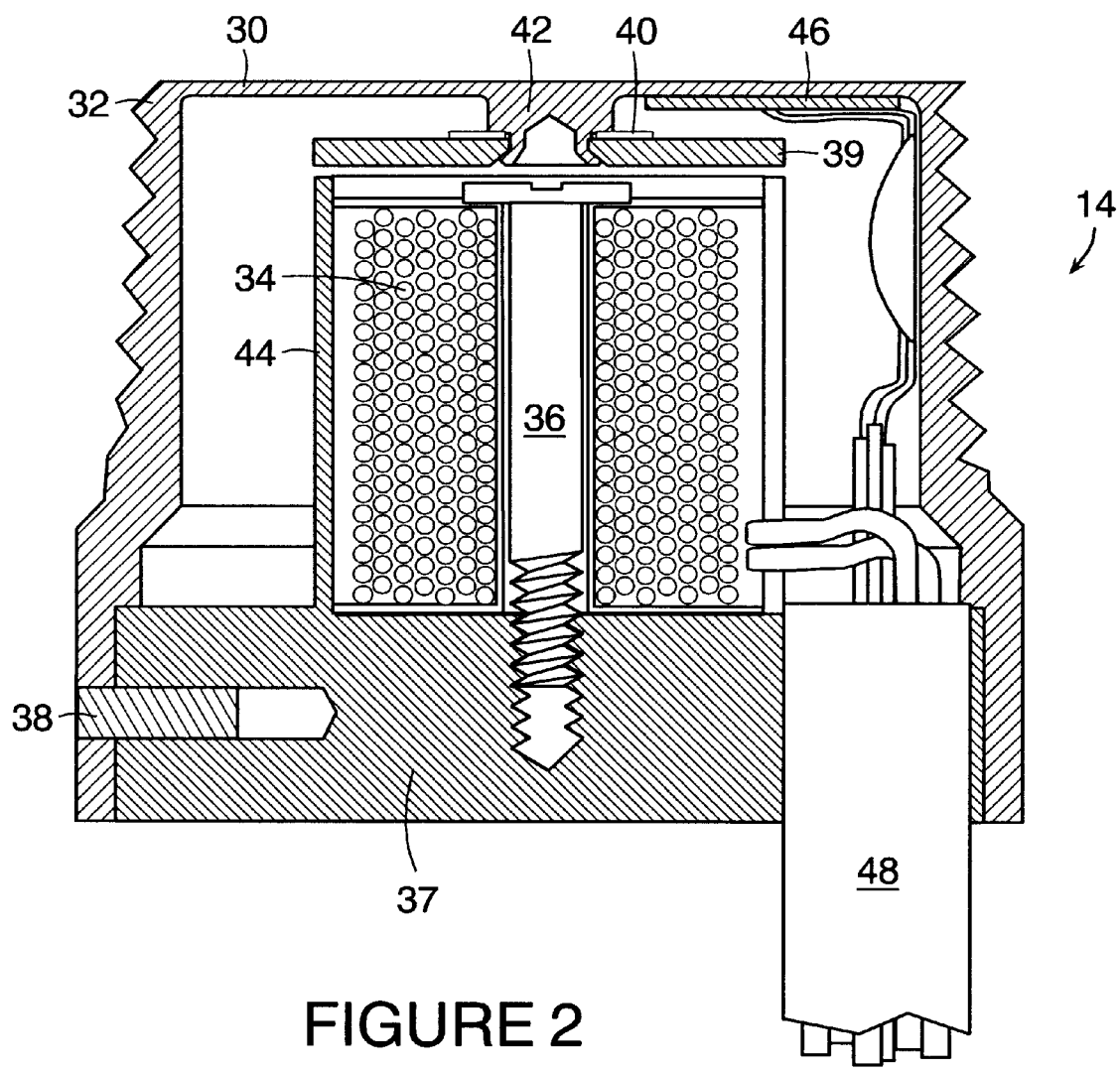
FIG. 2 is across-sectional view of the sensor assembly.

As FIG. 2 shows, the sensor assembly 14 includes the diaphragm 30. In the illustrated embodiment, the diaphragm is integrally formed with a diaphragm support 32, although it will probably be more convenient in most embodiments for the diaphragm to be a separate member appropriately secured to the diaphragm support 32. The illustrated diaphragm support 32 forms exterior threads by which the assembly is mounted in FIG. 1's chamber housing 16. I prefer for the diaphragm support 32 and diaphragm 30 to be made of 15-5 or 17-4 stainless steel or some similar high-strength, corrosion-resistant material, but other materials may be substituted. Note that the illustrated embodiment's diaphragm mounting is quite simple. This is possible because the present invention's approach to dealing with pressure effects, which will be explained below, eliminates the need for complicated pressure-equalizing mounting techniques.

As part of a diaphragm exciter, the illustrated embodiment includes a coil 34. The coil 34 may include, say, one hundred of so turns of # 24 AWG magnet wire wound on a bobbin secured by a retaining screw 36 to a ferromagnetic sensor-assembly base member 37 with respect to which pin(s) 38 hold the diaphragm support 32 in position. The magnetic flux that the coil generates follows a circuit that includes the ferromagnetic retaining screw 36 and a gap between it and a ferromagnetic disk 39 secured by a belleville washer 40 and crimping or similar mechanical means to a post 42 that the diaphragm 30 forms in its center. The flux path also includes the disk 39 and a gap between that disk and a ferromagnetic annular coil housing 44 formed by the assembly base 37. In the assembly's quiescent state, the gap sizes are determined by the ambient reservoir pressure. If that pressure is excessive, the central gap closes completely, and the retaining screw supports the diaphragm to reduce the likelihood of damage.

In the illustrated embodiment, the coil is repeatedly pulsed, as will be described in more detail below, and the resulting magnetic field momentarily draws disk 39 and thus the center of the diaphragm 30 toward the coil. Following the pulse excitation the disc will oscillate while returning to its stable position. To sense not only the diaphragm 30's response to this flexural excitation but also its static flexure as a result of ambient pressure, the system includes a flexure sensor. In the illustrated embodiment, the flexure sensor employs a single transducer for both quantities, namely, a strain gauge 46 so mounted as to be sensitive to strain that results from the diaphragm 30's flexure. The sensor could instead include separate transducers, but I prefer a strain gauge or a variable-reluctance, transducer which is similarly well suited to measuring both quantities.

Figure 3:
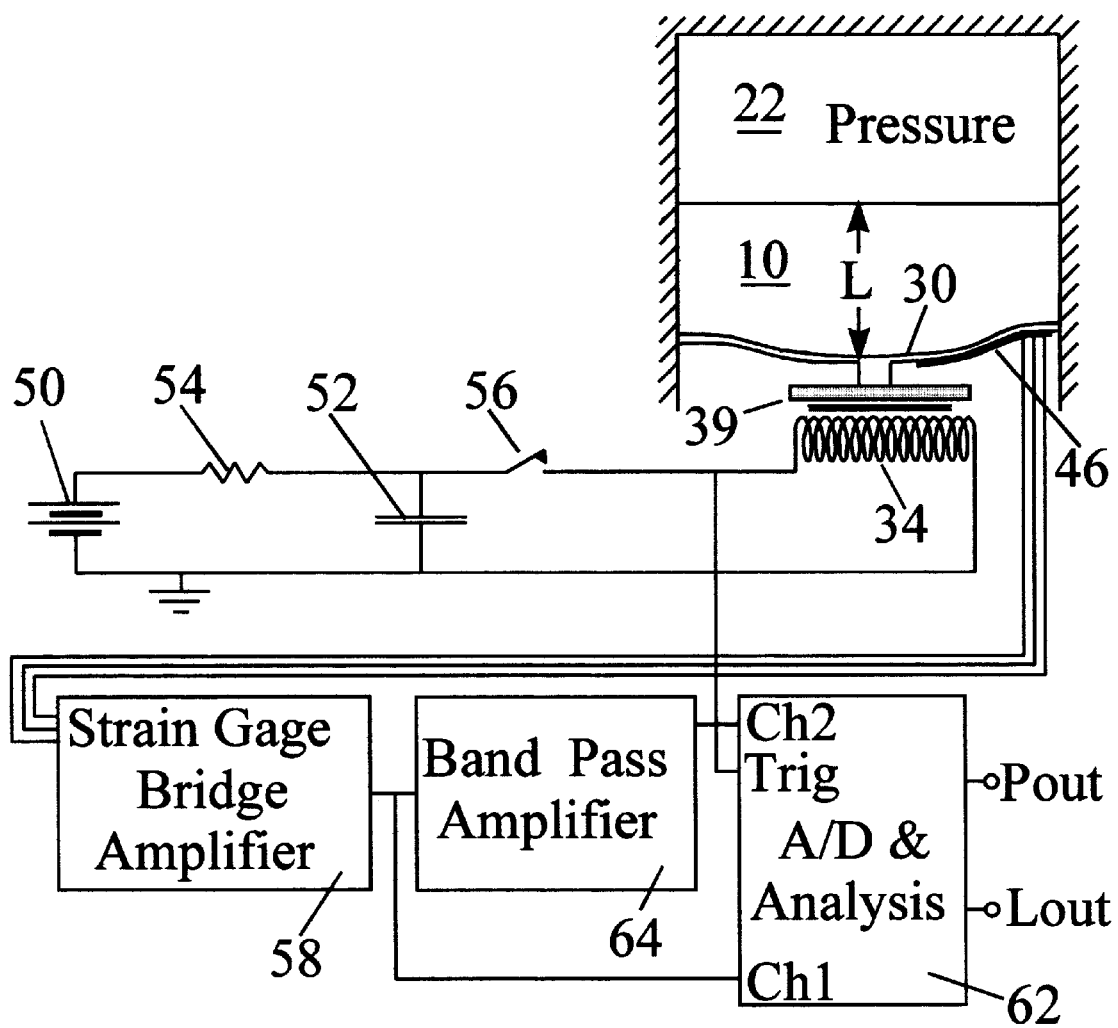
FIG. 3 is schematic diagram of the circuitry employed by the sensor assembly to determine liquid level and ambient pressure.

A cable 48 extending through a hole in the base 37 provides a path by which electrical connections are made from the coil 34 and strain gauge 46 to circuitry that FIG. 3 depicts. In that drawing, a power source 50 charges a capacitor 52 through a current-limiting resistor 54. Periodic momentary closures of a switch 56 permit the capacitor to discharge through the coil 34. The resultant magnetic pulses cause oscillatory flexure in the diaphragm 30. The flexure frequency depends on the diaphragm 30's loading not only by the liquid 10 but also by the ambient reservoir pressure.

To measure that response as well as the static flexure that ambient pressure causes, circuitry 58 connected to the strain gauge 46 places the gauge in an appropriate bridge circuit and amplifies the bridge-circuit output. The result is a signal that becomes the input to one channel of a circuit 62 for converting the analog signal to digital form and performing various computations to be described below. The bridge-amplifier output is also the input to a bandpass amplifier 64 whose pass band is a range of frequencies that includes any natural flexure frequencies that the diaphragm is expected to exhibit. That range will exclude the low-frequency contribution resulting from the static pressure load on the diaphragm 30. The resultant filtered output is the input to a second channel of circuit 62.

Triggered by the pulse applied to a coil 34, circuit 62 begins sampling its two channels' inputs. In a system in which the range of expected natural frequencies extends from 2 kHz to 4 kHz, I have taken 1024 samples at an 8-kHz sampling rate. This sampling rate is adequate to avoid aliasing, and the 1024-sample record is long enough to yield approximately an 8-Hz frequency resolution. Conventional processing identifies the highest-amplitude frequency component. That component's frequency is taken as the measured natural frequency.

The first channel's samples are averaged to yield a value corresponding to the DC flexure level.

The relationship that liquid depth bears to measured ambient pressure and natural frequency depends on sensor geometry as well as the geometry of the environment in which the sensor is employed. But when I have used an arrangement such as that of FIG. 1, which employs a separate measuring chamber, the relationship has been largely independent of the reservoir geometry. So calibrating the system only for the particular sensor and measuring chamber ordinarily suffices; there ordinarily is no need to perform further calibration when the sensor is installed.

Figure 4:
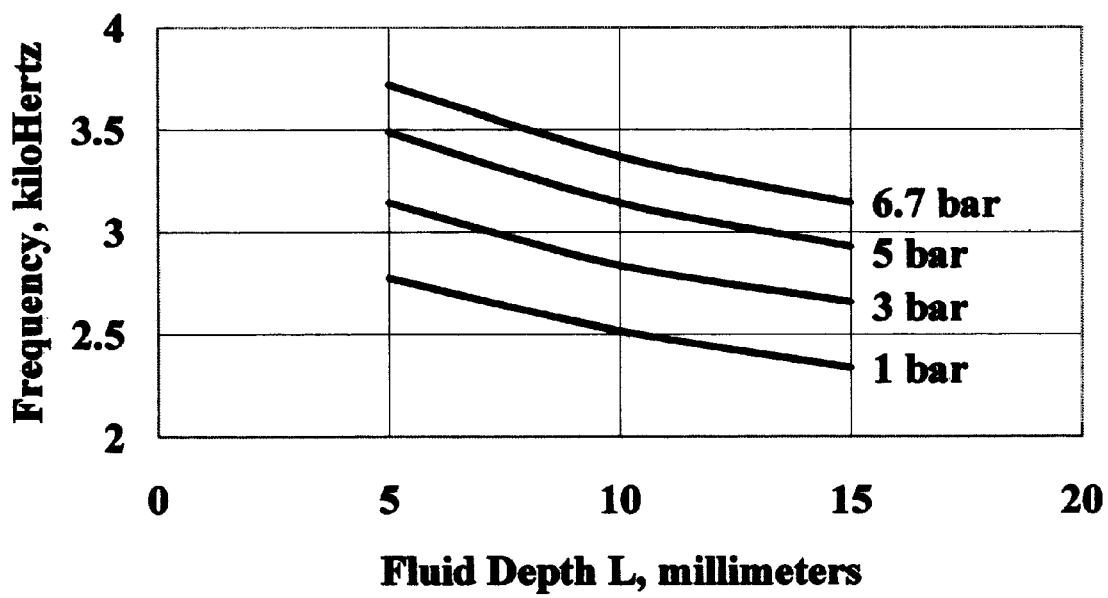
FIG. 4 is a plot depicting the relationships between fluid depth and diaphragm natural frequency for several selected ambient pressures.
Figure 5:
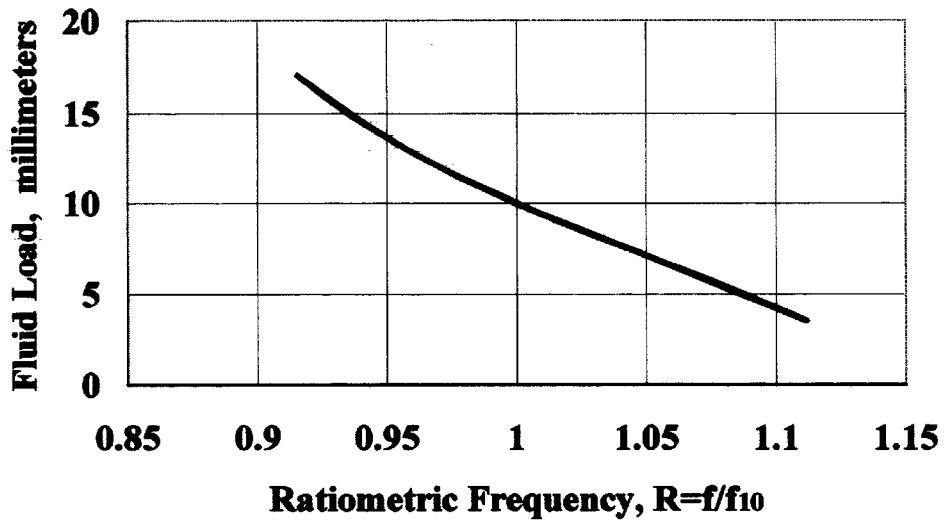
FIG. 5 is a plot depicting the relationship between liquid level and ratio metric frequency observed by the system of FIG. 3.

There is nothing critical about the particular way in which that calibration is performed, and many approaches will suggest themselves to those skilled in the art. To understand the approach that I have taken, we first consider the nature of the relationship involved. FIG. 4 depicts that relationship for a particular geometry. It shows that the measured frequency is a decreasing function of depth and an increasing function of ambient pressure.

My approach characterizes this relationship in a three-step process. In the first step, I determine the relationship between the DC-flexure measurement and diaphragm-face pressure (which is the sum of the pneumatic overpressure and the hydrostastic head). This is an inherently one-dimensional relationship, and I take calibration data for it by merely making DC-flexure measurements for a number of pressures at any convenient liquid level. From these data I use conventional techniques to compute a polynomial relationship between DC flexure and pressure that fits the data to the desired degree of accuracy. In applications to which I have applied it, where I have needed a pressure accuracy of 1% throughout a pressure range of 0–7 bar, I have found that a second-order polynomial is appropriate:

$$p = a_2 s_{DC}^2 + a_1 s_{DC} + a_0. \tag{1}$$

Here p is the pressure, $S_{DC}$ is the measured DC flexure, and the $a_n$'s are the coefficients determined during calibration. In some instances, a linear relationship may suffice.

The second and third steps establish the function that relates liquid depth to measured pressure and natural frequency. Although this function has a two-dimensional domain, it turns out that it can be derived by taking only enough calibration data to establish two one-dimensional-domain functions. The second and third steps include taking those data.

Specifically, the second step includes taking frequency measurements at different pressure values for a single reference fluid level of, say, 10 mm, and fitting a polynomial to the resultant data. In my work it has turned out that a second-order polynomial is appropriate, so I use conventional curve-fitting techniques to determine the coefficients $b_n$ in the relationship:

$$f_{10}(p) = b_2 p^2 b_1 p + b_0, \tag{2}$$

where $f_{10}(p)$ is the natural frequency that results when the liquid depth is at a reference value (in this case, 10 mm) and the pressure is p. Again, a simple linear relationship may suffice in some cases. Also, the calibration process may instead combine the relationships of equations (1) and (2), finding coefficients for the relationship between $f_{10}(p)$ and $S_{DC}$, for applications in which there is no need for a separate pressure output.

The third step includes taking frequency measurements at different liquid levels for a single reference pressure of, say, 1.0 bar and fitting a polynomial to the resultant data. In this case, though, I take the frequency data in terms of the ratio $R \equiv f/f_{10}(p)$ between the measured natural frequency and the natural frequency determined during the first step for the pressure at which the third-step calibration data are taken. I have found that a third-degree polynomial fits the data accurately enough, so the coefficients determined in the curve-fitting operation are the $C_n$'s in the relationship:

$$L = c_3 R^3 + c_2 R^2 + c_1 R + c_0, \qquad (3)$$

where L is liquid depth. It turns out that thus expressing the relationship ratiometrically makes the coefficients independent of ambient pressure, and this is the reason why I am able to determine the two-dimensional-domain function from only enough calibration data for two one-dimensional-domain functions.

For a given design of sensor assembly and measurement chamber, this calibration operation should only have to be performed once; however, if measurements are not made in a separate chamber, a calibration operation may need to be performed on installation.

With the sensor thus calibrated, the operation used by the analysis circuitry 62 to determine an unknown liquid level from the measured natural frequency and pressure involves using the relationships of equations (1) and (2) to infer $f_{10}(p)$ from the DC-flexure value $S_{DC}$, using the resultant $f_{10}(p)$ value to determine $R \equiv f/f_{10}(p)$ from the measured natural frequency f and determining the liquid level from the resultant R value in accordance with equation (3). The analysis circuitry 62 produces an output signal $L_{out}$ representative of the result, and it may also produce another output signal $P_{out}$ representative of the ambient-pressure value used in making the level measurement.

Although I have found the above-described approach to be advantageous, there are numerous other ways of employing the present invention, i.e., of determining fluid load as a function of both static deflection and response to excitation. For example, the conversion from frequency and static flexure to liquid level need not be performed algorithmically. A look-up-table approach may occasionally be preferred.

Clearly, the static-flexure measurement does not have to be made contemporaneously with the response measurement. Indeed, it may be considered preferable to make that measurement during a short period just before the impulse is applied. On the other hand, the static-flexure measurement can be made together with the response measurement as part of, say, a discrete Fourier- or cosine-transform analysis. In that case, the in put would not be bandpass filtered, and the lowest-bin output would be the static-flexure measurement.

There also is no reason why the excitation needs to be a single short pulse. For instance, an alternative is the excitation described by Alexandrovich et al. That approach uses a phase-locked loop in which the voltage-controlled oscillator is so controlled as to maintain a predetermined phase relationship between the excitation signal and the measured flexure output. The maintained phase relationship is the one associated with excitation at the natural frequency, and that response's frequency can either be measured directly or inferred from the voltage-controlled-oscillator control signal.

As another alternative, the excitation signal could be random, so long as it has significant power in the range of expected natural frequencies, and the response could be cross-correlated with the excitation signal to determine the diaphragm's characteristic response.

Also, the excitation force need not be applied magnetically; electrostatic, magnetorestrictive, or other approaches can be used instead. And the sensing transducer need not be a strain gauge; variable-reluctance and capacitive-sensing techniques are examples of alternatives. Indeed, although I prefer to use a common transducer for both the staticflexure and the flexural-response measurements, there is no reason why separate transducers could not be used.

It should also be apparent that the present invention can be adapted to addition of various enhancements as environmental conditions dictate. For instance, although the example describes liquid level as being determined as a function of measured static flexure and flexural response only, the function may additionally include terms for other measured quantities, such as temperature.

Figure 6:
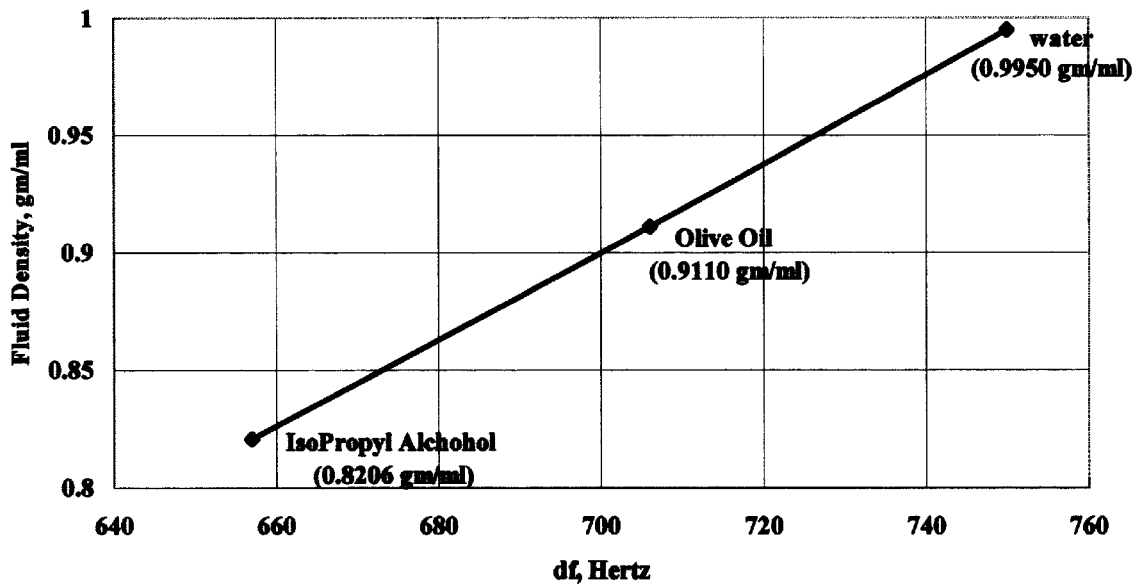
FIG. 6 a plot depicting the relationship between fluid density and the difference between observed natural frequencies at different liquid levels.

Although the foregoing example uses the liquid loading on the diaphragm to determine the liquid level of a known-density liquid, it can also be employed to determine the density of a known-level liquid. For one configuration of sensor assembly and measuring chamber, for instance, FIG. 6 gives the relationship that density bears to the difference between the frequency measured at 30 mm and the calibration-process-determined no-liquid-load frequency at the measured pressure. Clearly, the present invention's teaching of using the static-flexure measurement to compensate for the effects of ambient pressure can be applied to measurements of this type, too.

So the present invention can be employed in a wide range of embodiments and thus constitutes a significant advance in the art.

What is claimed is:

1. A fluid-load sensor comprising:
   A) a flexible diaphragm forming first and second diaphragm faces;
   B) a diaphragm support that so supports the flexible diaphragm as to enable its first face to be exposed to an unknown fluid load;
   C) a diaphragm exciter that subjects the diaphragm to flexural excitation;
   D) a flexure sensor producing both static and response outputs respectively indicative of the diaphragm's static flexure and its response to flexural excitation by the diaphragm exciter; and
   E) a computation circuit that computes fluid load as a function of both the response and static outputs and generates a measurement output indicative thereof.

2. A fluid-load sensor as defined in claim 1 wherein the fluid load computed by the computation circuit is liquid level.

3. A fluid-load sensor as defined in claim 1 wherein the fluid load computed by the computation circuit is liquid density.

4. A fluid-load sensor as defined in claim 1 wherein the flexure sensor includes a strain gauge so mounted as to be sensitive to strain that results from the diaphragm's flexure and generate a strain-gauge output indicative thereof.

5. A fluid-load sensor as defined in claim 4 wherein the flexure sensor produces its static output from the strain-gauge output.

6. A fluid-load sensor as defined in claim 4 wherein the flexure sensor produces its response output from the strain-gauge output.

7. A fluid-load sensor as defined in claim 6 wherein the flexure sensor produces its static output from the strain-gauge output.

8. A fluid-load sensor as defined in claim 1 wherein the diaphragm exciter includes a coil that is energized to excite the diaphragm by magnetic force.

9. A fluid-load sensor as defined in claim 8 wherein the diaphragm exciter includes a capacitor periodically discharged through the coil to energize it.

10. A fluid-load sensor as defined in claim 9 wherein the flexure sensor includes a strain gauge so mounted as to be sensitive to strain that results from the diaphragm's flexure and generate a strain-gauge output indicative thereof.

11. A fluid-load sensor as defined in claim 10 wherein the flexure sensor produces its static output from the strain-gauge output.

12. A fluid-load sensor as defined in claim 10 wherein the flexure sensor produces its response output from the strain-gauge output.

13. A fluid-load sensor as defined in claim 12 wherein the flexure sensor produces its static output from the strain-gauge output.

14. A fluid-load sensor as defined in claim 1 wherein:

A) the flexural excitation causes oscillatory diaphragm flexure having a flexure frequency; and B) the computation circuitry computes fluid load from the flexure frequency.

15. For measuring fluid load, a method comprising:

A) exposing at least one face of a flexible diaphragm to a fluid to be measured;

B) subjecting the diaphragm to flexural excitation;

C) sensing both the static flexure of the diaphragm and its response to the flexural excitation; and D) computing fluid load as a function of both the sensed static flexure and the sensed response.

16. A method as defined in claim 15 wherein

A) the flexural excitation causes oscillatory diaphragm flexure having a flexure frequency; and B) the computing step includes computing the fluid load from the flexure frequency.

17. A method as defined in claim 16 wherein:

A) the method further comprises a calibration operation that includes determining flexure frequencies for a plurality of static flexures at a known reference liquid level; and B) the computing step includes computing the fluid load from the ratio of the measured flexure frequency to the flexure frequency determined during the calibration operation for the measured static flexure.

* * * * *